No. 747,536. PATENTED DEC. 22, 1903.
F. E. CATON.
CLOD CRUSHER.
APPLICATION FILED JUNE 17, 1903.
NO MODEL.
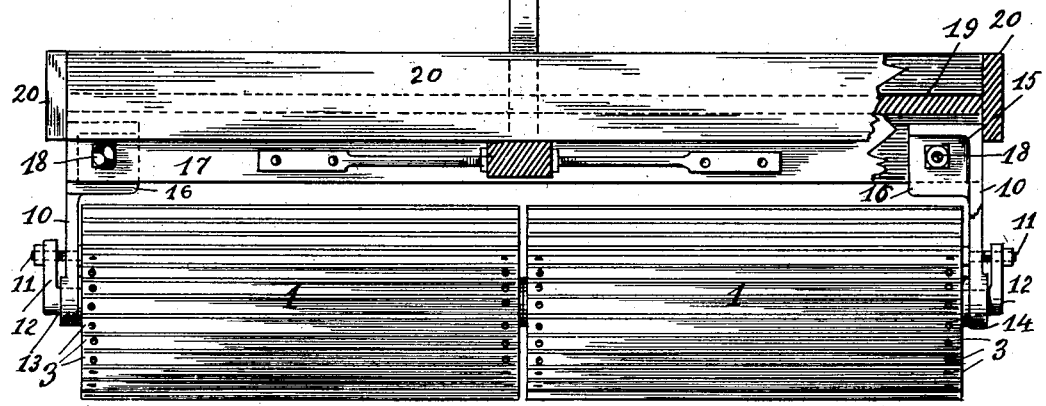
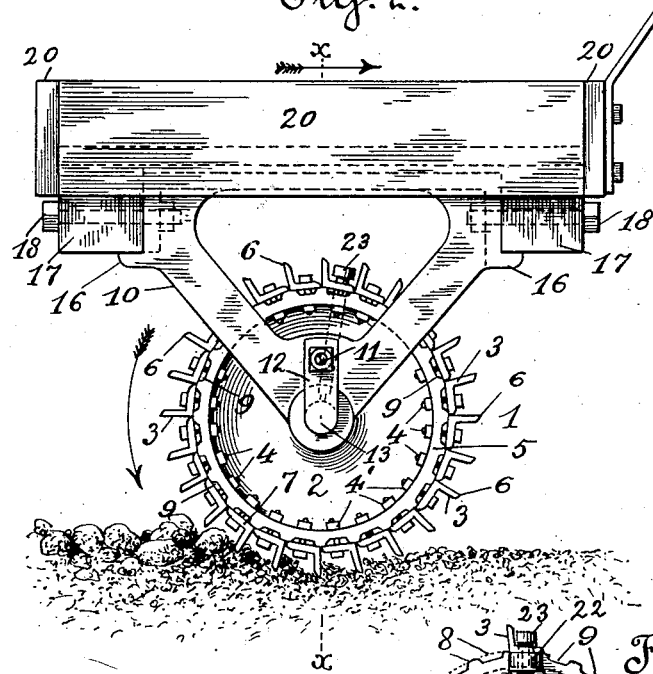
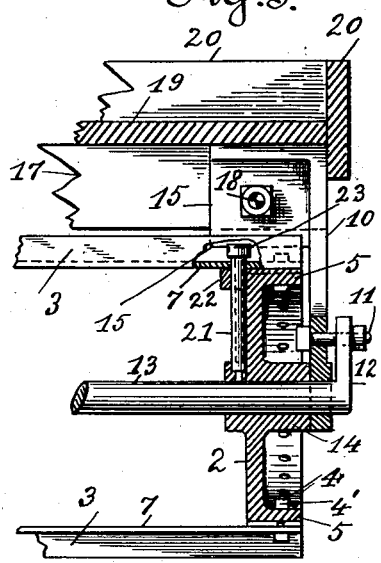
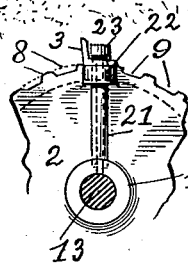
Witnesses.
H. Monteverde,
Walter F. Vane.
Inventor.
Fred E. Caton
by Wm. F. Booth
his Attorney No. 747,536. Patented December 22, 1903.

UNITED STATES PATENT OFFICE.

FRED E. CATON, OF SAN JOSE, CALIFORNIA, ASSIGNOR TO CATON'S FOUNDRY & MACHINE CO., OF SAN JOSE, CALIFORNIA, A CORPORATION OF CALIFORNIA.

CLOD-CRUSHER.

SPECIFICATION forming part of Letters Patent No. 747,536, dated December 22, 1903.

Application filed June 17, 1903. Serial No. 161,815. (No model.)

*To all whom it may concern:*

Be it known that I, FRED E. CATON, a citizen of the United States, residing at San Jose, county of Santa Clara, State of California, have invented certain new and useful Improvements in Clod-Crushers; and I do hereby declare the following to be a full, clear, and exact description of the same.

My invention relates to that class of cultivating implements used for breaking and crushing clods and pulverizing the soil which comprise in their construction suitably-armed rollers surmounted by a weighted frame.

My invention has for its object the provision of a clod-crusher of simple and economical construction, with great strength and durability and which is efficient in operation; and to this end my invention consists in the novel construction, arrangement, and combinations of parts, which I shall now describe by reference to the accompanying drawings, in which—

Figure 1 is a front elevation, partly broken, of my clod-crusher. Fig. 2 is an end view of same, enlarged. Fig. 3 is a sectional detail of one end on line $x\,x$ of Fig. 2. Fig. 4 is a broken detail of one of the end heads.

The crushing-rollers, which are designated by 1, may be one or more in number. Each roller consists of end heads 2, united by breaker-bars 3. These bars are of angle iron or steel, and they are secured to the heads 2 by bolts 4, which pass down through the base members of the bars and through peripheral flanges 5 of the heads and receive nuts 4' below. In practice angle iron or steel is made with sharp edges along the extremities of its outer faces. One of these sharp edges I have designated by 6. It must now be noted that in applying the angle-iron bars 3 to the heads 2 this sharp edge 6 in the radial member of the bar is set to face the direction in which, as shown by the arrow, the roller revolves on its axis. This edge therefore acts as a cutter in striking the clods and earth and more effectively breaks and reduces the soil.

Although the angle breaker-bars may be bolted to the heads in any practical manner, the best results are attained by the novel constructions I shall now point out.

The base flanges or members 7 of the angle-bars 3 being straight on their under surfaces are seated on the flanges 5 of the end heads 2 upon straight planes 8, cut or formed in said flanges, so that they find a stable bearing. The flanges 5 are cut out or recessed under the base members 7, as shown at 9, and the bolts 4 pass down through said recesses. The effect of this is that upon tightening the nut 4' sufficiently the base member 7 has a tendency to spring down into the recesses 9, which springing tendency is sufficient to strain on the bolt and tighten, and thereby lock the nut, preventing it from working loose.

The rollers 1, which have now been described, are carried and weighted by a superstructure as follows: 10 represents end brackets, preferably of cast-iron and of triangular outline apex down. To the lower ends of these brackets are secured by bolts 11 the arms 12 of axles 13, which pass through said lower ends and have journaled upon them the hubs 14 of the heads 2. The axles are therefore fixed, while the heads turn freely upon them. At the upper end of the side arms of the brackets 10 are flanges 15, turned at right angles to the arms and having outwardly-projecting base-lips 16, upon which rest the sills or timbers 17 of the weight-frame. These sills are secured by bolts 18 through the flanges 15, and they support the flooring 19 and the edge strips 20, which together form a box for the reception of any desired weight.

21 is an oil-pipe cast into hub 14 of the head 2 and thence lying radially along the inner plain face of the head, being held in place at its outer end by a cast lug 22. The end of pipe 21 projects through the base member of one of the breaker-bars and receives a cap 23.

Having thus described my invention, what I claim as new, and desire to secure by Letters Patent, is—

1. In a clod-crusher, a roller comprising peripherally-flanged end heads having their flanges formed with a series of straight planes, provided with recesses, breaker-bars of angle metal, L-shaped in cross-section, each bar resting with one of its members on the straight planes of said head-flanges and covering the recesses, its other member extending radially from said rollers, and bolts passing through the base member, recesses and flanges, to secure said bars to the heads.

2. In a clod-crusher, a roller comprising peripherally-flanged end heads having in their peripheries a series of recesses; and radially-projecting breaker-bars connecting said heads, said bars having base members seated on the flanged peripheries of the heads over the recesses therein, and secured thereto by bolts passing through said recesses and flanges.

3. In a clod-crusher, a roller comprising end heads having in their peripheries a series of recesses; and peripherally-disposed breaker-bars connecting said heads, said bars being made of angle-iron their base members being seated on the peripheries of the heads over the recesses therein and secured thereto by bolts passing through said recesses, and the radial members of said bars having at their extremities sharp edges arranged to face the direction of axial rotation of the roller.

In witness whereof I have hereunto set my hand.

FRED E. CATON.

Witnesses:
SAML. G. TOMPKINS,
T. E. STRAUS.